United States Patent [19]
Fink et al.

[11] Patent Number: 5,664,328
[45] Date of Patent: Sep. 9, 1997

[54] TOOL FOR REMOVING A METALLIC PLUG FROM A TUBE

[75] Inventors: David J. Fink, Greentree; James W. Everett, Hempfield Township, Westmoreland County; Annette M. Costlow, Trafford; James J. Roberts, Irwin; Paul J. Boone, Bethel Park, all of Pa.

[73] Assignee: Westinghouse Electric Corporation, Pittsburgh, Pa.

[21] Appl. No.: 387,656

[22] Filed: Feb. 13, 1995

Related U.S. Application Data

[62] Division of Ser. No. 203,631, Feb. 28, 1994, Pat. No. 5,465,483.

[51] Int. Cl.$^6$ ................................................. B23P 15/26
[52] U.S. Cl. ..................... 29/890.031; 29/727; 29/426.6; 29/402.03; 165/76; 138/89
[58] Field of Search ........................... 29/723, 727, 726, 29/890.031, 890.043, 402.03, 426.6; 165/76; 376/451, 203, 204; 138/89

[56] References Cited

U.S. PATENT DOCUMENTS

| | | |
|---|---|---|
| 4,366,617 | 1/1983 | Nanstiel et al. ........................ 29/727 |
| 4,436,117 | 3/1984 | Martin ................................. 29/402.14 |
| 4,679,315 | 7/1987 | Overbay ................................... 29/726 |
| 4,751,944 | 6/1988 | Sinha et al. ............................... 138/89 |
| 4,776,072 | 10/1988 | Jacquier ................................. 29/426.5 |
| 4,787,420 | 11/1988 | Wilhelm .................................... 29/523 |
| 4,793,056 | 12/1988 | Kurokawa et al. ......................... 29/726 |
| 4,829,660 | 5/1989 | Everett et al. ............................ 29/727 |
| 4,967,468 | 11/1990 | Vossbrinck et al. ....................... 29/726 |
| 5,117,548 | 6/1992 | Griffith et al. .......................... 29/426.4 |
| 5,255,717 | 10/1993 | Nelson et al. ............................. 138/89 |
| 5,402,828 | 4/1995 | Pino .......................................... 138/93 |

*Primary Examiner*—S. Thomas Hughes
*Assistant Examiner*—Marc W. Butler

[57] ABSTRACT

A method of removing a metal plug from a conduit includes the steps of simultaneously applying a static pull force and repetitive impulses to the plug. The method is particularly suited to removing a plug from a heat exchanger tube in a nuclear powered steam generator. A tool for practicing the method on such plugs includes a first hydraulic actuator for first moving an expansion member out of engagement with an interior plug wall, a second hydraulic actuator capable of attachment to the plug for applying a static pull force to the plug, and an arrangement connecting an air impact tool to the second hydraulic actuator for applying, simultaneously with the static force, high-frequency impulses to the plug entirely through solid members.

12 Claims, 2 Drawing Sheets

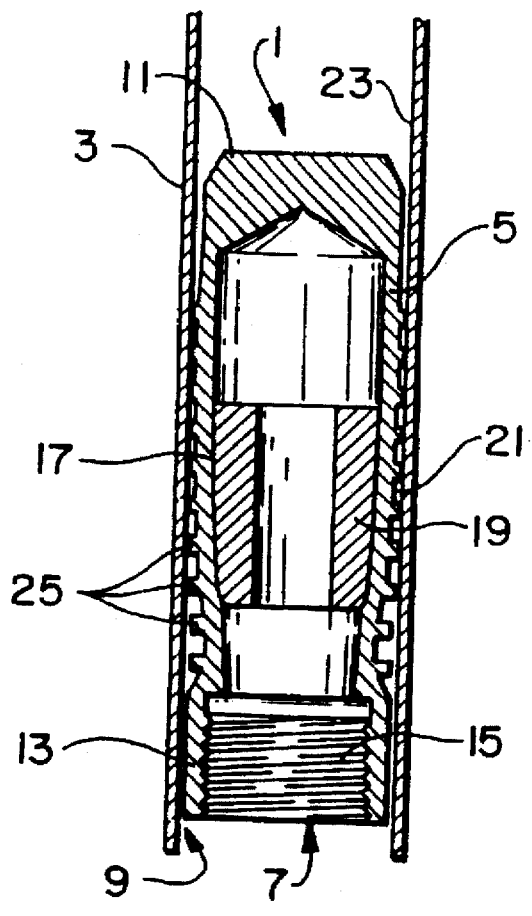
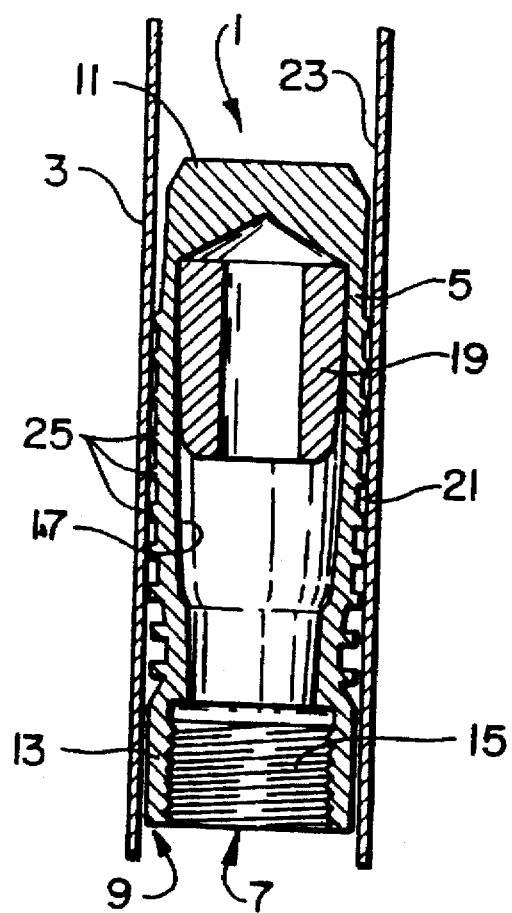
FIG. 1
FIG. 2

TOOL FOR REMOVING A METALLIC PLUG FROM A TUBE

This is a division of application Ser. No. 08/203,631 filed Feb. 28, 1994 now U.S. Pat. No. 5,465,483.

CROSS REFERENCE TO RELATED APPLICATION

The following application filed on Feb. 28, 1994 relates to a method and tool for removing a metalic plug from a tube: Ser. No. 203, 632, entitled PNEUMATIC TOOL AND METHOD FOR PLUG REMOVAL, by Annette M. Costlow, Paul J. Boone, Randall A. Holmes and James J. Roberts, Westinghouse Case No. 58,310.

BACKGROUND OF THE INVENTION

1. Field of the Invention

This invention relates to tools for removing a plug from a conduit, and, more particularly, to the removal of a plug from a heat exchanger tube mounted in a tube sheet of a nuclear powered steam generator by simultaneously applying a static pull force and an impulsive and repetitive, or periodic, pull force to the plug.

2. Description of the Prior Art

Tooling systems for removing plugs from heat exchanger tubes in nuclear powered steam generators are known in the prior art. It is desirable to remove such plugs in order that marginally corroded or damaged heat exchange tubes can be refurbished and put back in service, thereby increasing the capacity of a nuclear steam generator to produce power.

The plugs typically used for plugging heat exchanger tubes in nuclear steam generators are formed from a tubular shell fabricated of a nickel alloy, such as Inconel®. The shell is open at an end near an open end of the conduit, or tube, near a face of a tube sheet in the steam generator, and closed at its opposite end distal from the tube opening. One common type of plug, described in commonly owned U.S. Pat. No. 4,390,042, to Kucherer, includes an internally threaded plug skirt at the open end and a tapered, corkshaped expander member contained completely in the interior of the shell. Before fixing the plug to the tube, the larger, circular end of the expander member is in abutment with the inner surface of the closed end of the plug shell. The shell inner surface is slightly tapered from the closed end to an axial position near the threaded plug skirt. When the corkshaped expander member is forcefully drawn from the closed end towards the open end of the shell by a hydraulic ram, it radially expands the plug into sealing engagement with the interior surface of the tube by a wedging action. The forceful pulling of the cork-shaped expander member along the longitudinal axis of the shell further applies an extruding force to the metallic walls of the shell. A plurality of annular lands circumscribing the outer walls of the shell become sealingly engaged against the interior surface of the heat exchanger tube.

The traditional method for removing mechanical plugs, such as the plug described above, includes the steps of first pushing back the internal expander with a push-rod, and then pulling the plug with a hydraulic puller. Typically, the threads of the plug skirt are used for attachment of the puller to the plug. This method of pushing the expander back and pulling has severe problems. First, and most limiting, is that the bottom of the plug (the plug skirt) often breaks off before the plug dislodges. This is particularly undesirable since the only remaining recovery method, drilling, is now made difficult by a loose expander. When a plug is pulled successfully, the inner surface of the tube is often deeply scored by the pulling process. This scoring usually dictates a reaming process if the tube is to be replugged at a later date and may be severe enough to prevent a tube from being put back in service.

Another method for removing such plugs is described in commonly owned U.S. Pat. 4,903,392, to Stickel, et al. According to this method, the plug is heated with an electrically conductive push-rod by ohmic heating to a temperature that lowers its tensile yield strength, and an axial force is applied to the plug to elongate it, thereby radially contracting the plug and relaxing the engagement between the plug and the inner surface of the tube. After cooling, the plug may then be pulled out of the tube. This heat relaxation method requires a complex tooling system and also has some severe limitations. The plug shell can tear, or separate, during the step of pushing back the expander or elongating the plug shell. In this event, the tube will most likely need to be reamed and replugged. U.S. Pat. No. 4,800,637, to Overbay, also describes a method by which the plug shell is mechanically elongated, but without the heating step.

Another method for removing such plugs from heat exchanger tubes is disclosed in commonly owned U.S. Pat. No. 4,829,660, to Everett et al. The expander element is pushed back out of engagement with the tapered inner surface of the plug and forced through the closed end of the plug shell. A TIG torch is then used to create beads along the longitudinal axis of the plug shell to relax the engagement between the shell and the tube. This method also requires a complex tooling system. Further, if the plug shell separates during the expander push-back, a TIG burn will be made in the tube wall, likely requiring reaming and replugging of the tube.

Plug drilling, such as disclosed in commonly owned U.S. Pat. No. 4,734,972, to Hawkins, is another method of plug removal but is usually undesirable because of the complexity of the process and the risk of damaging the tube sheet and the tubes. Drilling is also very slow and impractical for large numbers of plugs.

Alternative methods of plug removal have not been forthcoming because of the limitation of the breakage of the bottom of the plug and the difficulty in finding an alternate place to apply a removal force. Therefore, there is a need for a new method for removing plugs from heat exchanger tubes and similar conduits that does not suffer the disadvantages of the prior art methods.

SUMMARY OF THE INVENTION

These needs and others are satisfied according to the present invention for a method for removing a metallic plug that has been radially expanded into engagement with an inner surface of a conduit, or tube. The method includes the steps of applying a repetitive, or an about periodic, impact, or impulsive force to the direction about parallel to the longitudinal axis of the plug and tube, while simultaneously applying a static pull force to the plug in about the same first direction. Each impulse of the repetitive force, which is preferably directed towards a proximate opening of the conduit, causes a minute dislodgement of the plug in conjunction with the static pull force. When repetitive impulses are used, such as provided by an air hammer, the plug is quickly dislodged from the tube, using much smaller forces than utilized by conventional methods that use static pull forces alone. This results in fewer instances of plug skirt breakage and the problems associated with such. The repetitive impulse force also causes much less scoring and gouging of the inner surface of the tube, thereby providing, after plug removal, a better tube inner surface for refurbishment and reuse of the tube, thereby reducing the probability that the tube will need to be reamed and replugged.

The method is particularly applicable to the removal of cylindrical plugs used to seal the ends of the U-shaped heat exchanger tubes mounted in the tube sheets of nuclear steam generators. Such plugs typically include a generally cylindrical metallic shell having an internally threaded open end, or plug skirt, located near an opening of the heat exchanger tube at the face of a tube sheet, and a closed end distal from the tube opening. The wall of the plug shell is radially expanded into sealing engagement with the inner surface of the tube, or conduit, by forcefully drawing a cork-shaped expander element from the closed end down into engagement with a section of the plug shell having a tapered inner surface. To remove such a plug, the invention includes the further step of pushing the expander element from the engaged position back against the closed end of the shell before applying the repetitive impulse force and the static pull force.

According to another aspect of the invention, a tool for removing a plug from an end of a conduit, or tube, includes a repetitive force mechanism for applying a longitudinal, repetitive impulse force to the plug through solid members, and a static force mechanism for applying a longitudinal, static force to the plug while applying the repetitive impulse force.

According to another aspect of the invention, the tool is adapted for removing a plug that is formed of a metallic shell fabricated of a nickel alloy, a tapered interior surface section, an open end proximate the end of the tube, a closed end distal from the end of the tube and an expander member adapted for wedgingly coacting with the tapered interior surface section when moved into engagement therewith to expand the outer wall of the shell into engagement with an inner surface of the tube. The tool can further include a dislodgement mechanism for moving the expander member out of engagement with the tapered interior wall section.

The static force mechanism, according to another aspect of the invention, is a first hydraulic actuator that includes an elongated member about longitudinally aligned with the tube. The elongated member includes a grasping mechanism at a first end for removably engaging the plug near the open end of the plug. The first hydraulic actuator also includes a first piston connected to a second end of the elongated member, and a first hydraulic cylinder that includes an end wall spaced from the end of the tube. The end wall of the first hydraulic cylinder has a through hole longitudinally guiding the elongated member therethrough, a first seal engaging the elongated member in the through hole and permitting longitudinal movement of the elongated member therethrough, an interior surface defining a first hydraulic chamber with a surface of the first piston, and a second seal permitting movement of the piston while engaging a peripheral edge of the piston to the interior surface. The first hydraulic actuator further includes a stand-off member maintaining the end wall at a fixed distance from the end of the conduit, and a hydraulic connector for operably connecting the first hydraulic chamber to a source of pressurized hydraulic fluid.

According to another aspect of the invention, the repetitive force mechanism includes a repetitive force member having a first end attached to the first piston at a position spaced from the first hydraulic chamber, and a second end adapted for removable attachment of a pneumatic impact tool. Thus, the repetitive force is transmitted to the plug entirely through solid members. The elongated member and first piston transmit both the static force and the repetitive force.

The repetitive force member can also advantageously include an interior air channel extending to the second end for providing pressurized air to the pneumatic impact tool, and a gas connector for operably connecting the interior air channel to a source of pressurized air.

The dislodgement mechanism of the tool, according to another aspect of the invention, is a second hydraulic actuator that includes a push-rod member extending through a longitudinal through hole in the elongated member and beyond the ends thereof. A second piston connects to an end of the push-rod member distal from the plug. A second hydraulic cylinder can be formed by a recess in the first end of the repetitive force member. The second hydraulic cylinder defines a second hydraulic chamber with an end surface of the second piston distal from the plug. A third seal sealingly engages a peripheral edge of the second piston to second cylinder while permitting movement of the second piston within the second cylinder. The second hydraulic chamber can be pressurized with a hydraulic fluid from an external source via a second hydraulic connector.

An object of this invention is to provide a tool for removing a plug from a conduit, or tube, that reduces the likelihood of scoring the conduit during the removal process.

Another object of this invention is to provide a tool for removing a plug, formed by a plug shell having a threaded plug skirt, from a conduit that reduces the likelihood of breaking off the plug skirt or tearing the plug shell during the removal process.

Another object of this invention is to provide a tool for removing a plug from a conduit that does not require that an electrical current be applied to the plug.

Another object of this invention is to provide a tool for removing a plug from a conduit that does not require that a heat source be applied to the plug.

Another object of this invention is to provide a tool for removing a plug from a conduit wherein the forces applied to the plug are smaller than the forces applied using by prior art methods.

Another object of this invention is to provide a more reliable tool for removing a plug from a conduit, or tube, than provided by prior art methods.

Another object of this invention is to provide a tool that are especially suitable for removing a plug used to plug a heat exchanger tube of a nuclear powered steam generator.

These and other objects of the present invention will be more fully understood from the following description of the invention with reference to the illustrations appended hereto.

BRIEF DESCRIPTION OF THE DRAWINGS

FIG. 1 is a longitudinal section of a plug lodged in a tube, wherein an expander member is engaged with a tapered inner surface of the plug shell.

FIG. 2 is a similar view of the plug of FIG. 1, wherein the expander member is pushed back out of engagement with the tapered inner surface of the plug shell.

DESCRIPTION OF THE PREFERRED EMBODIMENTS

Figure 3:
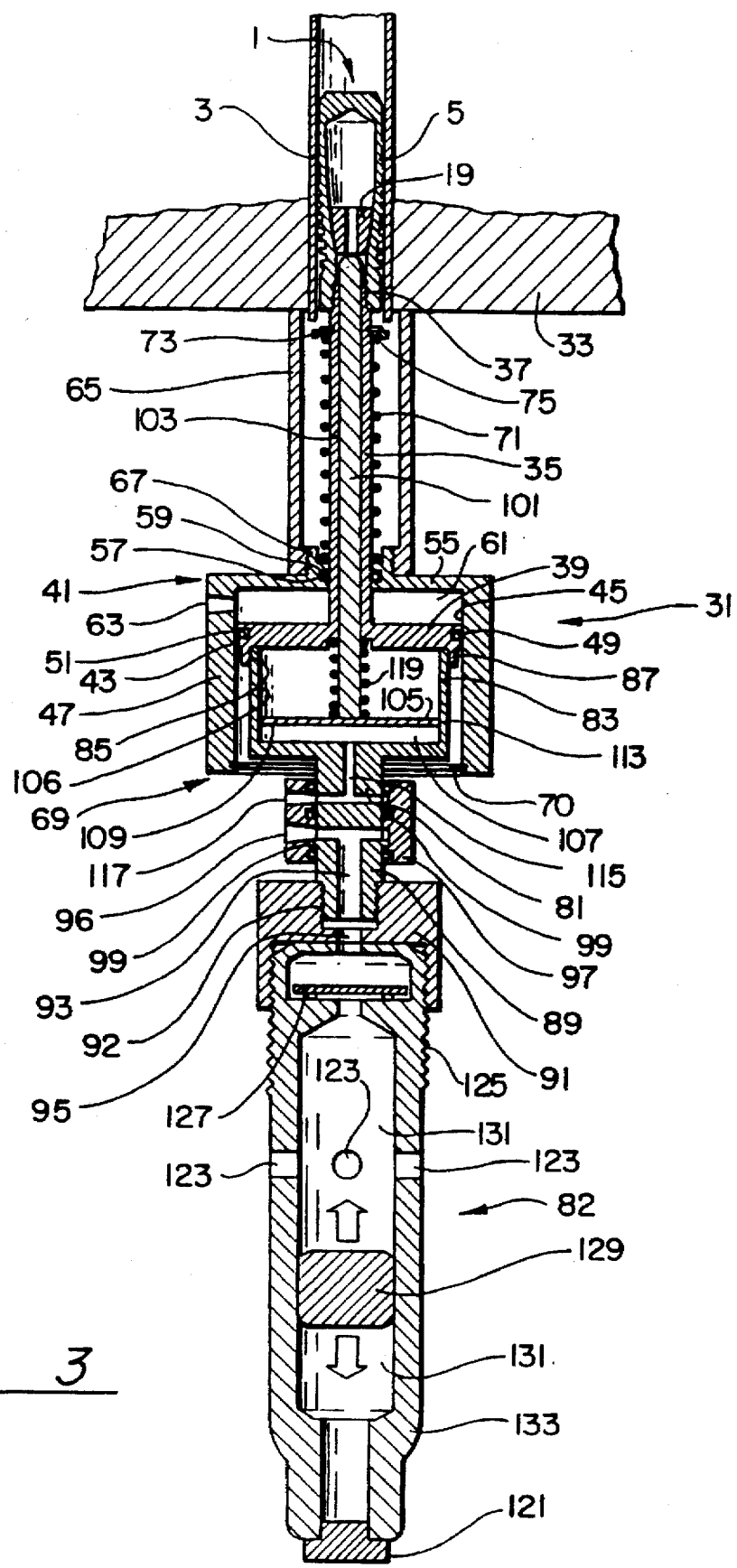
FIG. 3 is a longitudinal section view of a plug removal tool of this invention.

Referring now to the figures, and in particular to FIGS. 1 and 2, a plug 1 of the type commonly used to seal a heat exchanger tube in a nuclear powered steam generator is illustrated in cross section within such tube 3. Plug 1 is formed of a generally cylindrical, hollow, plug shell 5 about ¾–⅞ inch (1.91–2.22 cm) in diameter and a few inches long. Plug shell 5 is made of a nickel alloy, such as Inconel®, as is heat exchanger tube 3. An open end 7 of plug shell 5 is near the opening 9 of heat exchanger tube 3, and a closed end 11 is distal from opening 9. A plug skirt 13 at open end 7 is tapped with threads 15 so that a pulling tool (not shown) with mating threads can be attached for gripping plug shell 5. An inner surface 17 of plug shell 5 is tapered down towards plug skirt 13. An expander member 19 inside plug shell 5 is also tapered towards plug skirt 13 for engaging tapered inner surface 17 when pulled down by a ram.

FIG. 1 shows the plug 1 with expander member 19 in the engaged position with tapered inner surface 17 of plug shell 5. As expander member 19 is pulled down into tapered inner surface 17, wall 21 of plug shell 5 is expanded radially outward and engages inner surface 23 of tube 3. Annular lands 25 formed on outer surface of wall 21 provide a secure seal. FIG. 2 shows plug 1 after expander member 19 has been pushed back out of engagement with tapered inner surface 17 by, for example, a push-rod (not shown).

Referring now also to FIG. 3, wherein similar structures common to each figure will be referenced by the same reference numbers throughout this specification for simplicity of exposition, a tool 31 of this invention for extracting heat exchanger plug 1 is illustrated in longitudinal cross section. Heat exchanger tube 3 is shown emplaced within a tube sheet 33 of a heat exchanger (not shown). Tool 31, which can have a high degree of structural symmetry about a cylindrical axes aligned with the longitudinal axis of tube 3 and plug 1 as illustrated in the figure, utilizes hydraulic pressure to extract plug 1. The design allows a pneumatic impact tool, such as an air hammer, to transmit its force directly to the plug through solid members. This is necessary in order to achieve the full effect of the hammering. Tool 31 includes two separate actuators and three different mechanical functions. After pushing plug expander 19 back from engagement with tapered inner surface 17 of plug shell 5, a static pull force is applied to plug shell 5 simultaneously with a high-frequency, impulsive, pull force to cause many minute movements of plug 1. Experience has shown that using an axial pull force alone to pull plugs will often exceed the tensile strength of plug skirt 13, causing plug skirt 13 to break off. This invention permits use of a smaller static pull force than prior art methods of plug removal, thus avoiding the skirt breakage problem.

Tool 31 transfers static pull and high-frequency, impulsive, pull forces to plug shell 5 via a tubular, elongated member 35 that engages threads 15 of plug skirt 13 with mating threads 37 at a first end. The other end of elongated member 35 is connected to a first piston 39 inside a first hydraulic cylinder 41 to form a first actuator. A resilient hydraulic seal between the peripheral edge 43 of piston 39 and an inside surface 45 of a cylinder side wall 47 is provided by, for example, a preferably neoprene o-ring 49 seated in an o-ring groove 51 in peripheral edge 43 of first piston 39. Elongated member 35 extends through an opening 53 in an end wall 55 of first hydraulic cylinder 41. A second resilient seal, such as a preferably neoprene o-ring 57 seated in an o-ring groove 59 in opening 53 in end wall 55, insures hydraulic integrity of a first hydraulic chamber 61 that is defined by first piston 39, end wall 55 and inside surface 45 of side wall 47. First hydraulic chamber 61 can be pressurized by an external source (not shown) of pressurized hydraulic fluid through a hydraulic connector 63 in first hydraulic cylinder 41 connecting with first hydraulic chamber 61.

A cylindrical spacer 65 concentrically surrounding elongated member 35 is attached to end wall 55, for example, by a threaded fitting 67, and maintains first hydraulic cylinder 41 at a fixed distance from tube sheet 33 when first hydraulic chamber 61 is pressurized. An end 69 of first hydraulic cylinder 41 opposite from end wall 55 is open to atmospheric air and first piston 39 is free to move longitudinally within cylinder 41 in response to changes of pressure within first hydraulic chamber 61. Retainer 70 keeps first piston 39 within cylinder 41.

A first compression spring 71 is used for retracting first piston 39 when the elongated member 35 is detached from plug skirt 11 and pressure in first hydraulic chamber 61 is released. First compression spring 71 extends between end wall 55 and a retainer ring, provided by, for example, washer 73 press fit into an annular groove 75 in elongated member 35.

Repetitive, about periodic, impulses are transmitted to plug shell 5 also via elongated member 35 and first piston 39. A repetitive force member 81 connects a source (not shown) of repetitive impulses, which can be provided by an air impact tool, such as, for example, a modified standard air hammer 82, to first piston 39. A first end 83 of repetitive force member 81 is attached to the first piston 39 at a position spaced from first hydraulic chamber 61. The attachment to first piston 39 is preferably removable and can be provided by, for example, threads 85 on first end 83 screwed into a mating threaded fitting 87 on first piston 39. A second end 89 of repetitive force member 81 connects to an adapter 91 for removable attachment of air impact tool 82 by, for example, a threaded fitting. Repetitive force member 81 also includes an interior air chamber 93 extending to an opening 95 at second end 89 for providing pressurized air to air impact tool 82. A pneumatic connector 96 in a swivel fitting 97 operably connects interior air chamber 93 to a source of pressurized air (not shown). Resilient seals can be provided by for example, neoprene o-rings 99.

Expander member 19 is moved out of engagement with tapered interior surface 17 by a second hydraulic actuator, including a push-rod member 101 extending through a longitudinal through hole 103 in elongated member 35 and beyond the ends thereof. A second piston 105 is connected to an end of push-rod member 101 distal from plug 1. A cylindrical recess 106 in first end 83 of repetitive force member 81 defines a second hydraulic chamber 107 with an end surface 109 of second piston 105 distal from plug 1. A third resilient seal (not shown), which can be provided by, for example, a preferably neoprene o-ring seated in o-ring groove in the peripheral edge of second piston 105 and engaging a surface of recess 116, insures hydraulic integrity of second hydraulic chamber 117 and permits longitudinal movement of second piston 105 within the second hydraulic chamber 107. Second hydraulic chamber 107 can be pressurized with a hydraulic fluid through a channel 115 extending through repetitive force member 81 into second hydraulic chamber 107. A source (not shown) of pressurized hydraulic fluid is operably connected to channel 115 via a hydraulic connector 117 in the swivel fitting 97.

The second hydraulic actuator can preferably include a second compression spring 119 for spring biasing second piston 105 away from first piston 39. This is useful for removing hydraulic fluid from second hydraulic chamber 107 when tool 31 is not in use.

The swivel fitting 97 for making hydraulic and pressurized air connections allows turning of tool 31 so as to engage skirt threads 15 with threads 37 on elongated member 35.

Air hammer 82 can preferably be a modified version of Dayton Air Hammer Model 2Z486C. Air hammer 82 is modified by disassembling and discarding the chisel, retention spring and body (not shown). Plug 121 is preferably welded into the end formerly receiving the chisel to provide the required back pressure for operation. A plurality of side holes 123 are added to allow proper air discharge. Air hammer cylinder mounting threads 125 are modified slightly to allow better fitup with adapter 91. A valve assembly 127 at the end of air hammer 82 connected to adapter 91 also regulates internal air pressure for proper operation of air hammer 82. Air entering through valve assembly 127 drives piston 129 forward. Piston 129 strikes a distal end of internal chamber 131, transferring an impulsive force to the air hammer body 133. Air hammer body 133, being firmly attached to tool 31, transfers an impulsive force to removal tool 31. Piston 129 rebounds and is given additional rebound momentum by rerouting of supply air to the distal, plugged end of the cylinder via internal holes and scoops (not shown). Valve assembly 127 closes off air supply and piston 129 rebounds against a trapped volume of air in the opposite end of the chamber 131. The trapped volume of air is compressed until the direction of the piston is reversed, valve assembly 127 opens and the cycle repeats.

A plug 1, typically used in plugging heat exchanger tube 3 in a nuclear powered steam generator, can be removed by tool 31 by first screwing threads 37 of elongated member 35 snugly into threads 15 of the plug skirt 13. Cylindrical spacer 65 should butt against tube sheet 33 so as to not damage the end of heat exchanger tube 3. Tool 31 should be connected to the sources of pressurized hydraulic fluid at the connectors 63 and 117 and to the source of pressurized gas at connector 96, and air hammer 82 or other such air impact tool attached to high-frequency member adapter 91. Pressurization of second hydraulic chamber 107 raises push-rod member 101 up against plug expander member 19, dislodging it from its seated position in tapered inner surface 17 of plug shell 5. Preferably, pressure in second hydraulic chamber 107 is then released, allowing second piston 105 and push-rod member 101 to retract to a lowered position. Pressurization of first hydraulic chamber 61 exerts a static pull force on plug shell 5 via elongated member 35. When air hammer 82 is turned on, a high-frequency impact pulling force will also be exerted upon the plug shell through solid members 35, 39, 81, and 91. This will cause many rapid, minute dislodgements of plug shell 5 from its engaged position in heat exchanger tube 3, gradually withdrawing the plug 1.

Air impact tools typically operate at about 3000 Hz, however, the repetitive impact force can be advantageously applied within a broad range of frequencies that can be as low as 0.1 Hz, or even less. A preferred frequency range for practicing the invention with an air hammer is from about 1000 Hz to about 6000 Hz. However, other arrangements that use different means for applying the repetitive force can have different preferred frequency ranges.

Whereas particular embodiments of the present invention have been described above for purposes of illustration, it will be appreciated by those skilled in the art that numerous variations of the details may be made without departing from the invention as described in the appended claims.

We claim:

1. A tool for removing a plug from a conduit, comprising impacts means for applying repetitive to the plug in a first direction about longitudinally aligned with a longitudinal axis of the plug and a static force means for applying a static force to the plug in about the first direction while applying the repetitive impacts.

2. The tool of claim 1, wherein the static force means and the impulse means each include a solid member directly applying the static force and the repetitive impacts to the plug.

3. The tool of claim 2, wherein the impulse means includes means applying repetitive impacts to the plug at a frequency of at least about 0.1 Hz.

4. The tool of claim 1, wherein the plug comprises a metallic plug shell having a tapered interior surface section, an open end proximate an open end of the conduit and a closed end distal from the end of the conduit, and an expander member adapted for wedgingly coacting with the tapered interior surface section when moved into engagement therewith to expand a wall of the plug shell such that an outer surface of the plug shell engages an inner surface of the conduit, the tool further comprising disengagement means for moving the expander member out of engagement with the tapered interior wall section.

5. The tool of claim 4, wherein the static force means comprises a first hydraulic actuator that includes:
   an elongated member about longitudinally aligned with the conduit, comprising grasping means at a first end for removably engaging the plug near the open end;
   a first piston connected to a second end of the elongated member;
   a first cylinder comprising an end wall spaced from the end of the conduit and including a through hole axially guiding the elongated member therethrough, and an interior surface defining a first hydraulic chamber with the first piston;
   stand-off means for maintaining the end wall at a fixed distance from the end of the conduit; and
   means for operably connecting the first hydraulic chamber with a source of pressurized hydraulic fluid.

6. The tool of claim 5, wherein the first hydraulic actuator further includes first spring bias means for spring biasing the first piston towards the end wall of the first cylinder.

7. The tool of claim 5, wherein the impulse means includes a repetitive force member, comprising a first end attached to the first piston at a position spaced from the first hydraulic chamber, and a second end adapted for removable attachment of an air impact tool.

8. The tool of claim 7, wherein the impulse means further comprises an interior air channel extending to the second end for providing pressurized air to the air impact tool, and means for operably connecting the interior air channel to a source of pressurized air.

9. The tool of claim 7, wherein the disengagement means comprises a second hydraulic actuator that includes:
   a push-rod member extending though a longitudinal through hole in the elongated member and beyond the ends thereof;
   a second piston connected to an end of the push-rod member distal from the plug;
   a second cylinder surrounding the second piston and defining a second hydraulic chamber with the second piston; and
   means for operably connecting the second hydraulic chamber with a source of pressurized hydraulic fluid.

10. The tool of claim 9, wherein the second cylinder is formed by the first piston and the repetitive force member.

11. The tool of claim 9, wherein the second hydraulic actuator further includes second spring bias means for spring biasing the second piston away from the first piston.

12. A tool for removing a metallic plug from a heat exchanger tube in a nuclear powered steam generator, wherein the plug comprises a plug shell having a tapered interior surface section and an open end proximate an open end of the tube at a face of a tubesheet in the generator, and an expander member adapted for wedgingly coacting with the tapered interior surface section when moved into engagement therewith to expand a wall of the plug shell such that an outer surface of the plug shell engages an inner surface of the tube, comprising:

a first hydraulic actuator for applying a static pull force to the plug shell in a first direction about longitudinally aligned with a longitudinally axis of the plug and towards the face of the tubesheet, including:

an elongated member about longitudinally aligned with the tube and having grasping means at one end for removably engaging the plug shell near the open end;

a first piston connected to an other end of the elongated member;

a first cylinder comprising an end wall spaced from the end of the tube, including a through hole sealingly guiding the elongated member therethrough in the axial direction, and an interior surface defining a first hydraulic chamber with a surface of the first piston;

stand-off means for maintaining the end wall at a fixed distance from the end of the tube; and means for operably connecting the first hydraulic chamber with a source of pressurized hydraulic fluid;

a repetitive force member for transmitting impulses to the plug, simultaneously with the static pull force in about the first direction, including a first end attached to the first piston at a position spaced from the first hydraulic chamber, and a second end adapted for removable attachment of an air impact tool; and a second hydraulic actuator for disengaging the expander member from the tapered interior surface section, including:

a push-rod member extending though a longitudinal through hole in the elongated member and beyond the ends thereof;

a second piston connected to an end of the push-rod member distal from the plug;

a second cylinder formed by the first piston and the repetitive force member, surrounding the second piston, and having a surface defining a second hydraulic chamber with an end surface of the second piston distal from the plug; and means for operably connecting the second hydraulic chamber with a second source of pressurized hydraulic fluid.

\* \* \* \* \*